US010913546B2

(12) United States Patent
Krauss et al.

(10) Patent No.: US 10,913,546 B2
(45) Date of Patent: Feb. 9, 2021

(54) LANDING AND CHARGING SYSTEM FOR DRONES

(71) Applicant: AIROBOTICS LTD., Petah Tikva (IL)

(72) Inventors: Ran Krauss, Tel Aviv (IL); Meir Kliner, Ramat Gan (IL)

(73) Assignee: AIROBOTICS LTD., Petah Tikva (IL)

( * ) Notice: Subject to any disclaimer, the term of this patent is extended or adjusted under 35 U.S.C. 154(b) by 550 days.

(21) Appl. No.: 15/548,834

(22) PCT Filed: Jan. 28, 2016

(86) PCT No.: PCT/IL2016/050094
§ 371 (c)(1),
(2) Date: Aug. 4, 2017

(87) PCT Pub. No.: WO2016/125142
PCT Pub. Date: Aug. 11, 2016

(65) Prior Publication Data
US 2018/0029723 A1    Feb. 1, 2018

(30) Foreign Application Priority Data
Feb. 5, 2015 (IL) .......................... 237130

(51) Int. Cl.
*B64F 1/00*    (2006.01)
*B64F 1/18*    (2006.01)
(Continued)

(52) U.S. Cl.
CPC .............. *B64F 1/00* (2013.01); *B64C 39/024* (2013.01); *B64F 1/02* (2013.01); *B64F 1/12* (2013.01);
(Continued)

(58) Field of Classification Search
CPC ...... B64F 1/00; B64F 1/18; B64F 1/12; B64F 1/02; G05D 1/0676; B64C 39/024;
(Continued)

(56) References Cited

U.S. PATENT DOCUMENTS 4,123,020 A    10/1978  Korsak
5,039,034 A    8/1991   Burgess et al.
(Continued)

FOREIGN PATENT DOCUMENTS

CN    103085991 A    5/2013
CN    103224031 A    7/2013
(Continued)

OTHER PUBLICATIONS

DE102013004881A1 English Translation.*
(Continued)

*Primary Examiner* — Assres H Woldemaryam
(74) *Attorney, Agent, or Firm* — Mintz Levin Cohn Ferris Glovsky and Popeo, P.C.; Steven M. Jensen

(57) ABSTRACT

A system for homing and recharging an unmanned vehicle comprises a plurality of homing layers operative along the radius of an imaginary circle that has the homing target at its center, each homing layer consisting of a sub-system provided with location means of increasing accuracy relative to that of a sub-system that operates along said radius farther away, from the center of said circle.

18 Claims, 7 Drawing Sheets

(51) Int. Cl.
*B64F 1/12* (2006.01)
*B64F 1/02* (2006.01)
*G05D 1/06* (2006.01)
*B64C 39/02* (2006.01)

(52) U.S. Cl.
CPC ............... *B64F 1/125* (2013.01); *B64F 1/18* (2013.01); *G05D 1/0676* (2013.01); *B64C 2201/027* (2013.01); *B64C 2201/182* (2013.01); *B64C 2201/201* (2013.01)

(58) Field of Classification Search
CPC ........ B64C 2201/182; B64C 2201/066; B64C 2201/201
See application file for complete search history.

(56) References Cited

U.S. PATENT DOCUMENTS

| | | | |
|---|---|---|---|
| 6,985,064 B1* | 1/2006 | Loukas | H02K 11/0094 336/234 |
| 8,453,966 B2 | 6/2013 | McGeer et al. | |
| 8,596,576 B1 | 12/2013 | McGeer et al. | |
| 8,630,755 B2 | 1/2014 | Ohtomo et al. | |
| 8,708,277 B1 | 4/2014 | McGeer et al. | |
| 8,714,482 B2 | 5/2014 | McGeer et al. | |
| 8,740,142 B2 | 6/2014 | McGeer et al. | |
| 8,788,119 B2 | 7/2014 | Tillotson et al. | |
| 8,930,044 B1 | 1/2015 | Peeters et al. | |
| 8,955,800 B2 | 2/2015 | McGeer et al. | |
| 8,955,801 B2 | 2/2015 | McGeer et al. | |
| 9,321,541 B2 | 4/2016 | Utsch | |
| 9,387,928 B1 | 7/2016 | Gentry et al. | |
| 9,387,940 B2 | 7/2016 | Godzdanker et al. | |
| 9,499,265 B2 | 11/2016 | Sanz et al. | |
| 9,527,605 B1 | 12/2016 | Gentry et al. | |
| 9,612,327 B2 | 4/2017 | Zhang et al. | |
| 9,637,245 B2 | 5/2017 | Yoffe | |
| 9,650,156 B2 | 5/2017 | McChesney | |
| 9,862,504 B1 | 1/2018 | Pounds et al. | |
| 10,007,272 B2 | 6/2018 | Tirpak et al. | |
| 10,287,033 B2 | 5/2019 | Hu | |
| 10,336,470 B2 | 7/2019 | Fisher et al. | |
| 10,414,517 B2 | 9/2019 | Wang et al. | |
| 10,509,416 B2 | 12/2019 | Wang | |
| 10,577,126 B2 | 3/2020 | Mozer | |
| 10,633,115 B2 | 4/2020 | Pilskalns | |
| 2003/0038698 A1* | 2/2003 | Hirayama | H01F 5/003 336/200 |
| 2012/0078451 A1 | 3/2012 | Ohtomo et al. | |
| 2012/0150364 A1* | 6/2012 | Tillotson | G05D 1/101 701/3 |
| 2013/0306791 A1 | 11/2013 | McGeer et al. | |
| 2014/0032034 A1 | 1/2014 | Raptopoulos et al. | |
| 2014/0091176 A1 | 4/2014 | McGeer et al. | |
| 2014/0091177 A1 | 4/2014 | McGeer et al. | |
| 2014/0124619 A1 | 5/2014 | McGeer et al. | |
| 2014/0124621 A1 | 5/2014 | Godzdanker et al. | |
| 2014/0203140 A1 | 7/2014 | McGeer et al. | |
| 2014/0284423 A1* | 9/2014 | Utsch | B64F 1/22 244/110 E |
| 2015/0129716 A1 | 5/2015 | Yoffe | |
| 2015/0336669 A1* | 11/2015 | Kantor | G01C 21/3415 701/3 |
| 2016/0001883 A1 | 1/2016 | Sanz et al. | |
| 2016/0011592 A1 | 1/2016 | Zhang et al. | |
| 2016/0144982 A1 | 5/2016 | Sugumaran | |
| 2016/0229557 A1 | 8/2016 | McChesney | |
| 2016/0257426 A1 | 9/2016 | Mozer | |
| 2017/0038778 A1 | 2/2017 | Wang | |
| 2017/0050749 A1 | 2/2017 | Pilskalns | |
| 2017/0073084 A1 | 3/2017 | Mozer | |
| 2017/0107001 A1 | 4/2017 | Barnes | |
| 2017/0139424 A1 | 5/2017 | Li | |
| 2017/0144776 A1 | 5/2017 | Fisher et al. | |
| 2017/0253349 A1 | 9/2017 | Wang et al. | |
| 2018/0029723 A1 | 2/2018 | Krauss et al. | |
| 2018/0039286 A1 | 2/2018 | Tirpak et al. | |
| 2019/0002127 A1 | 1/2019 | Straus et al. | |
| 2019/0009926 A1 | 1/2019 | Hu | |
| 2020/0031466 A1 | 1/2020 | Anderson | |
| 2020/0207485 A1 | 7/2020 | Foggia et al. | |

FOREIGN PATENT DOCUMENTS

| | | | | |
|---|---|---|---|---|
| CN | 103914076 A | 7/2014 | | |
| CN | 204250382 U | 4/2015 | | |
| DE | 102011119979 A1 | 6/2013 | | |
| DE | 102013004881 A1 * | 9/2014 | ............ | B60L 3/0046 |
| DE | 102013004881 A1 | 9/2014 | | |
| DE | 10 2014 003417 A1 | 9/2015 | | |
| EP | 2433867 A2 | 3/2012 | | |
| EP | 2218642 A3 | 2/2013 | | |
| KR | 10-2013-0122715 A | 11/2013 | | |
| KR | 20130122715 * | 6/2015 | ............... | B64F 1/12 |
| WO | 2007/141795 A1 | 12/2007 | | |
| WO | 2012078232 A1 | 6/2012 | | |
| WO | WO-2012078232 A1 * | 6/2012 | ............ | G05D 1/101 |
| WO | 2013/171735 A1 | 11/2013 | | |
| WO | 2015135523 A1 | 9/2015 | | |

OTHER PUBLICATIONS

International Search Report for International Application No. PCT/IL2016/050094, dated May 10, 2016, 2 pages.
International Search Report and Written Opinion for Application No. 11201706184T, dated May 10, 2018, 10 pages.
International Search Report for Internation Application No. PCT/IL2016050094, dated Jun. 13, 2018, 8 pages.

* cited by examiner

LANDING AND CHARGING SYSTEM FOR DRONES

FIELD OF THE INVENTION

The present invention relates to a system for directing, landing and charging unmanned aerial vehicles, such as drones, without obligatory human intervention.

BACKGROUND OF THE INVENTION

Drones are used for many purposes, such as detection, photography, and even small military attacks. The drones can be remotely-controlled by an operator, but they can also be programmed to fly in a predetermined route. Another common way for directing a drone is by using both the programming of a predetermined route and an operator who can intervene and take charge over the drone, when necessary. Throughout this description the terms "unmanned aerial vehicle (UAV)" and "drone" are used interchangeably.

In order to ensure a safe landing of a drone at a specific location, a skilled operator needs to direct the drone when it approaches its landing location. Since the known automatic systems usually lack the accuracy that is needed for landing a drone at a specific point, and drones are often damaged when the landing is not performed by an operator.

There is also a need to replace the battery of drones or to recharge them before every flight, which means that they must reach a location where they can be recharged. The recharging process usually requires a person to replace a battery or to connect the drone to a power supply, which means that a highly skilled operator must be present at the charging location, and it obviously increases the response time and the costs, and this way the system cannot be autonomously operated.

Therefore, it is an object of the present invention to provide a system suitable to direct, land, and charge drones autonomously.

It is another object of the invention to provide a system that will enable the use of drones without obligatory human intervention.

Other objects and advantages of the invention will become apparent as the description proceeds.

SUMMARY OF THE INVENTION

The invention relates to a system for homing and recharging an unmanned vehicle, comprising a plurality of homing layers, typically up to three layers, operative along the radius of an imaginary circle that has the homing target at its center, each homing layer consisting of a sub-system provided with location means of increasing accuracy relative to that of a sub-system that operates along said radius farther away from the center of said circle.

The unmanned vehicle can be a flying object, such as a drone. The location means are selected from among GPS, DGPS, computerized visual analysis systems, optical sensors, proximity sensors, or any other means that can indicate the location of a vehicle and/or charging plate or docking station. As will be apparent to the skilled person, such means may include well-known location-determining methods, such as triangulation methods, as well as advanced solutions, such as radio communication chips. Illustrative examples of known location systems include time-of-flight systems that determine the distance by measuring the time of propagation of pulsed signals between a transmitter and a receiver; optical trackers, such as laser ranging trackers; ultrasonic trackers; spatial scan systems that use (optical) beacons and sensors; inertial sensors; phase difference systems that measure the shift in phase of an incoming signal from an emitter on a moving target compared to the phase of an incoming signal from a reference emitter; direct field sensing systems that use a known field to derive orientation or position; and hybrid positioning systems. However, the invention is not limited to any specific system, sub-system or combination of methods. All methods, present or future, that can be used to determine the position of a UAV are meant to be covered by the invention.

The inner homing layer comprises physical positioning means, wherein the physical positioning means can be divided into centralizing means and grabbing means. The physical positioning means can comprise grippers, including gripping wires and electromagnetic assemblies. These work in cooperation with assemblies located on the drone, such as anchoring and mechanical lowering apparatus. The term "gripping wire", as used herein, is meant to indicate a wire that during the landing stage physically connects between the UAV and the landing platform and on which a tension can be applied to cause the UAV to be brought toward the landing platform. Similarly, the term grabbing may also refer to a system provided with locking means, which lock the gripping wire, usually at its lose end (proximal end), after it has been grabbed. For instance, a locking fork can be provided to lock a ball provided at the lose end of a gripping wire, after its location has been detected at the desired position and it has been grabbed by a strong electro-magnet. Such locking may, under some conditions, allow for a stronger tethering of the UAV to the landing plane.

The system can further comprise battery charging apparatus and/or battery replacing apparatus.

The sub-systems can be remotely-controlled, and the system can further comprise at least one data-management component, such as a processor and/or a receiver. The data-management component can be suitable to receive data from the vehicle.

In addition, the system can comprise other components that can provide data-management, data-analysis, and data-processing. The system can be further provided with communication means, a computer, different software programs, and different mechanical means, all suitable to navigate a vehicle to a charging platform and to provide for a safe landing of the vehicle on the platform, while processing and analyzing data, with the ability to send the data to the vehicle and/or to a control center and/or to other locations that are in communication with the system.

BRIEF DESCRIPTION OF THE DRAWINGS

The invention will be further illustrated with reference to the appended drawings, wherein.

DETAILED DESCRIPTION OF THE INVENTION

The system of the invention (also referred to as a "homing system") comprises a landing and charging platform that comprises a plurality of sub-systems, where each sub-system contributes to the directing and landing of drones on a charging platform.

The following description refers to the operation of drones, but the system of the invention can be used for any other aircrafts, vehicles, or other portable objects that need to be directed to a specific location.

In one aspect, the invention relates to a system for homing and recharging an unmanned vehicle, comprising a plurality of homing layers, typically but not limitatively, up to three layers, operative along the radius of an imaginary circle that has the homing target at its center, each homing layer consisting of a sub-system provided with location means of increasing accuracy relative to that of a sub-system that operates along said radius farther away from the center of said circle.

Figure 1:
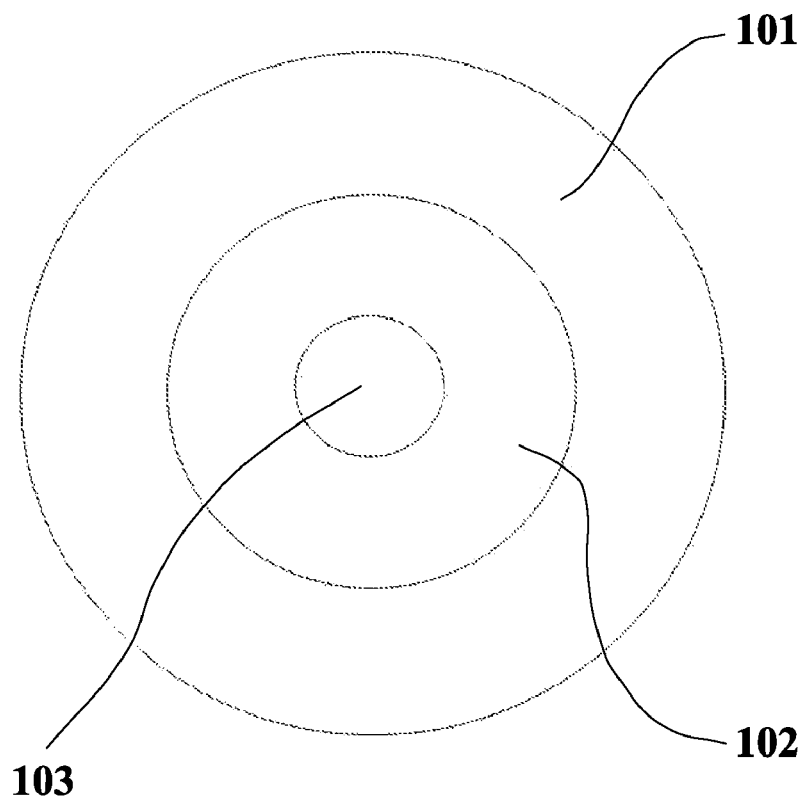
FIG. 1 is a schematic diagram of three sub-systems that represent three homing circles with different precisions, according to one embodiment of the invention.

FIG. 1 is a schematic diagram of three sub-systems that relate to three homing and landing stages, marked by three circles, where the center of the circles symbolizes a desired landing location for drones, according to one embodiment of the invention. First sub-system 101 relates to the first homing stage that, in this example, is performed by navigating drones based on a Global Positioning System (hereinafter also referred to as "a GPS or DGPS system"). When a drone receives its own location from the GPS system, and since the location of charging platform is known, it can navigate its way toward the charging platform. A drone can also receive details regarding the location of platforms, for example by wireless communication.

A GPS system is suitable for directing objects even from great distances, and therefore it is suitable to be used as the first sub-system. The accuracy of commercial GPS systems can reach up to approximately 3 m, while military systems have greater accuracy.

The second sub-system 102 is suitable for when the drone is closer to the platform and can be detected by optical sensors, proximity sensors, or computer vision, and can be referred to as "a proximity system". Alternative forms of sub-system 102 may include, for instance, RF systems that can be used to perform triangulation processes suitable to direct the drone toward the center of the landing platform, as well as any other suitable location-determining system, for instance, those mentioned hereinabove. A proximity system (optical, acoustical, or electromagnetic) can be located on a drone and/or on a charging platform. The sensing signals can be processed by a processor to compute the relative position of the drone in relation to the charging system.

A proximity system can have better accuracy than a GPS system because it may reach an accuracy of approximately 30 cm and, if desired, drones can be guided toward platform 103 by the said system.

Both the GPS system and the proximity system can communicate with a drone by any known wired or wireless communication means, such as radio, including, e.g., Wi-Fi connection or satellite. Drones are also able to communicate with a remote computer that can assess which system is more suitable at every location in which the drone is located.

The control over the chosen system can also be performed by an operator that can take charge over the drone and the sub-systems, if needed.

The third sub-system 103 is a system that provides a physical connection between a drone and a charging platform. Such sub-system can perform the physical connection by mechanical means, for example, by releasing a gripping wire from the drone toward the landing platform, which can be provided with a mount point, and when the connection is made between the mount point and the gripping wire, the drone can be pulled toward the platform, until it reaches a landing location on the platform. The gripping wire can be provided with a weight or a shaped part of a locking mechanism, at its end or at another point along its length, which may be made of ferromagnetic material and which locks into the central part of the landing platform, for instance, mechanically or magnetically.

The landing process can be significantly influenced by weather conditions, such as wind, and it is difficult to predict random air flow phenomena. For that reason it is usually very difficult to land a drone in a specific location with a deviation of a few centimeters. The third sub-system 103 overcomes that problem by providing a physical connection that forces a drone to reach a very specific landing point.

Third sub-system 103 can also comprise electro-magnetic apparatus, which is located at the desired landing location and which is suitable to apply magnetic traction on the loose end of a gripping wire of a drone while it is still in the air, that will pull it toward the landing location when a suitable force is applied on the wire, e.g, by the action of a winch located on the drone or by a pulling mechanism located in the landing platform. According to another embodiment of the invention, the third sub-system 103 can comprise a centralizing and grabbing mechanisms, for example, a cone-shaped component such that when a drone enters its inner void the mechanism is activated, thereby pulling the ball down its slope, mechanically or by gravity alone. The accuracy of the third sub-system is approximately 2 cm.

Figure 6:
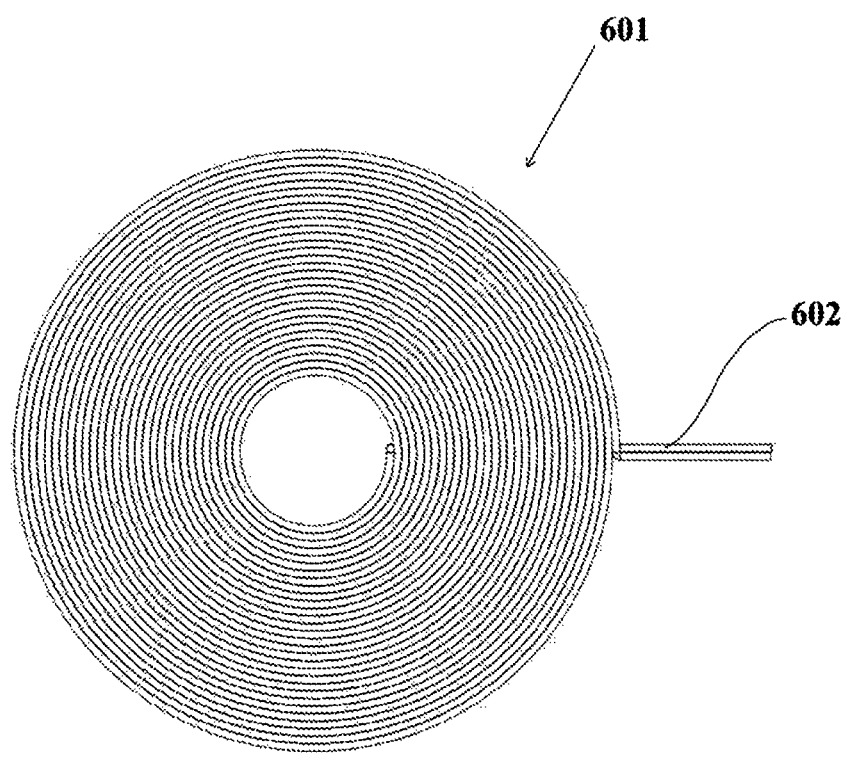
FIG. 6 is a top view of a flat coil, according to another embodiment of the invention.

One example of a structure of electro-magnets that is suitable to apply magnetic traction on the gripping wire of a drone, that will pull it toward the center of a charging platform is the structure of FIG. 6, showing a flat coil 601. Electric current can run through the edge 602 of coil 601 to generate a magnetic field, which creates traction of magnetic materials, such as metals, in the direction of the center of coil 601. If coil 601 is concentric with the imaginary circles of sub-systems 101, 102, and 103, a gripping wire of a drone that is pulled by coil 601 will be pulled toward the center of said imaginary circle, which is the homing target.

Additional means for overcoming weather conditions can be provided, such as pressure and/or motion sensors and a control unit that restrains the movement of the drone according to the environmental conditions. As aforesaid, an operator can intervene and take charge over the drone at any point, and can land the drone remotely, instead of relying on the autonomous landing process.

Figure 2:
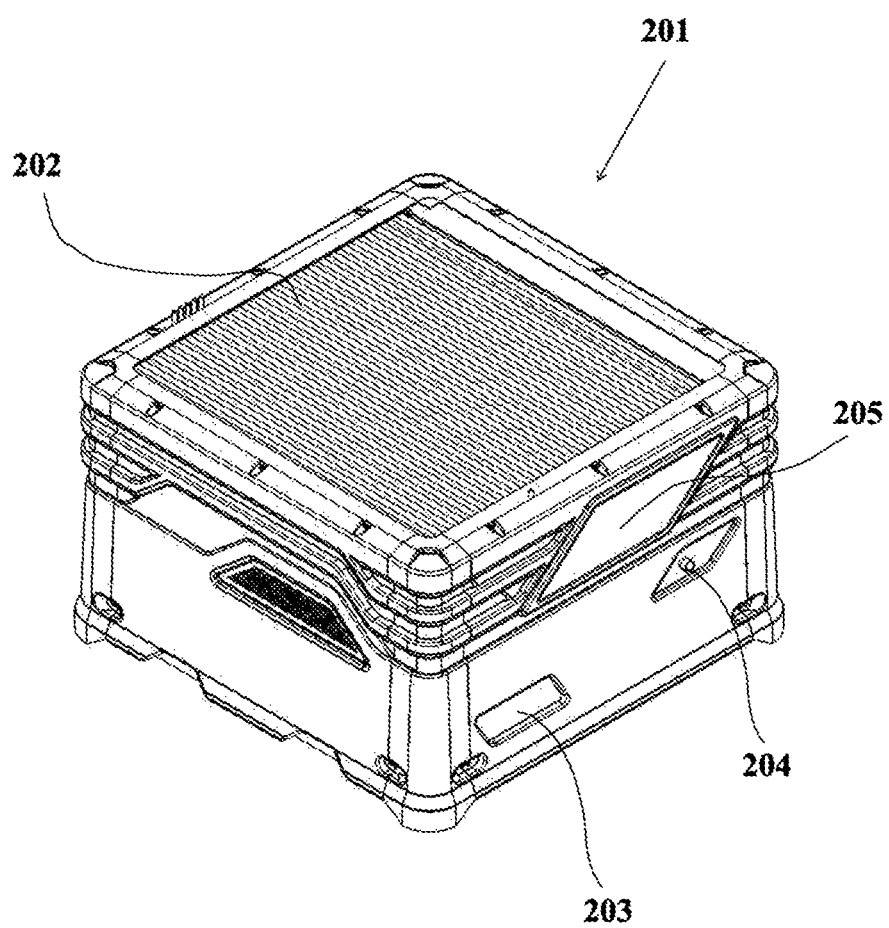
FIG. 2 is a perspective view of a closed charging platform, according to one embodiment of the invention.

FIG. 2 is a perspective view of a closed charging platform, according to one embodiment of the invention. Charging platform 201 is provided with a cover 202 to protect the inner components or a drone that can be housed within it (as will be shown in FIG. 3). Cover 202 can be automatically opened when a drone approaches charging platform 201.

Charging platform 201 is provided with a communication component 203 that is suitable to transmit and receive data from a drone and a control center where an operator is located. Charging platform 201 is also provided with a power plug 204 that can be connected to an outer power source that supplies power to the different components of charging platform 201. A screen 205 can also be provided for displaying different types of data, such as the location of drones and its distance from charging platform 201, and the estimated time that a drone can keep operating before it needs to be re-charged. When a drone is located within charging platform 201 (as will be shown in FIG. 3), screen 205 can also show the progress of the charging process of the drone. Of course any data can also be sent to an operator at a control center.

Power plug 204 can be replaced with any other power source component, such as a changeable and/or a rechargeable battery or with a solar energy collector.

Figure 3:
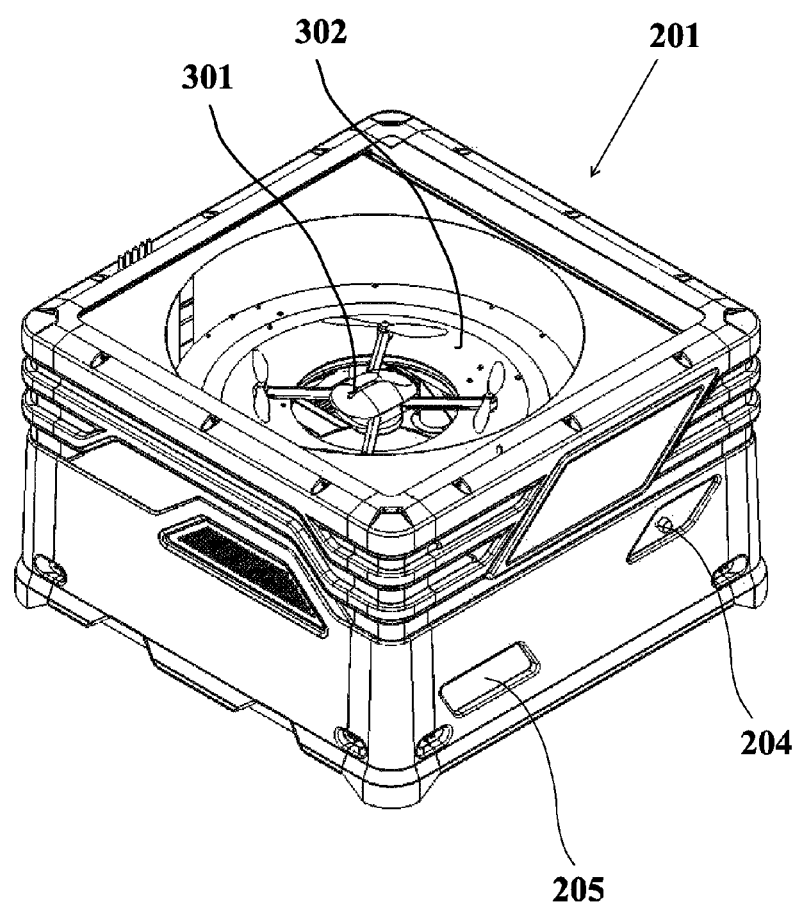
FIG. 3 is a perspective view of the charging platform of FIG. 2, when the cover is open and a drone is positioned within it.

FIG. 3 is a perspective view of charging platform 201 of FIG. 2, with cover 202 (not shown in the figure) in an open position and drone 301 which is located within charging platform 201. The landing surface 302 can be provided with magnetic induction components that are suitable to charge drone 301. Landing surface 302 is supplied with power through the connection of power plug 204 to a power source. Apart from charging drone 301, charging platform 201 can house drone 301 when it is not in use.

Charging platform 201 can also be referred to as "a docking station" since it is suitable not only for charging drones, but also for storage and protection of different vehicles. In addition, charging platform 201 can be used as a base station that can process and provide data.

The description refers to a charging platform as the landing platform, but of course the invention encompasses any similar landing platform, with or without a charging surface. In addition, the charging process can be a magnetic induction, but after a drone is positioned on a charging platform it can be charged by any other known means, for example, it can be further connected directly to an electrical current supply, or can be refurnished by replacing the batteries with charged ones.

Figure 4:
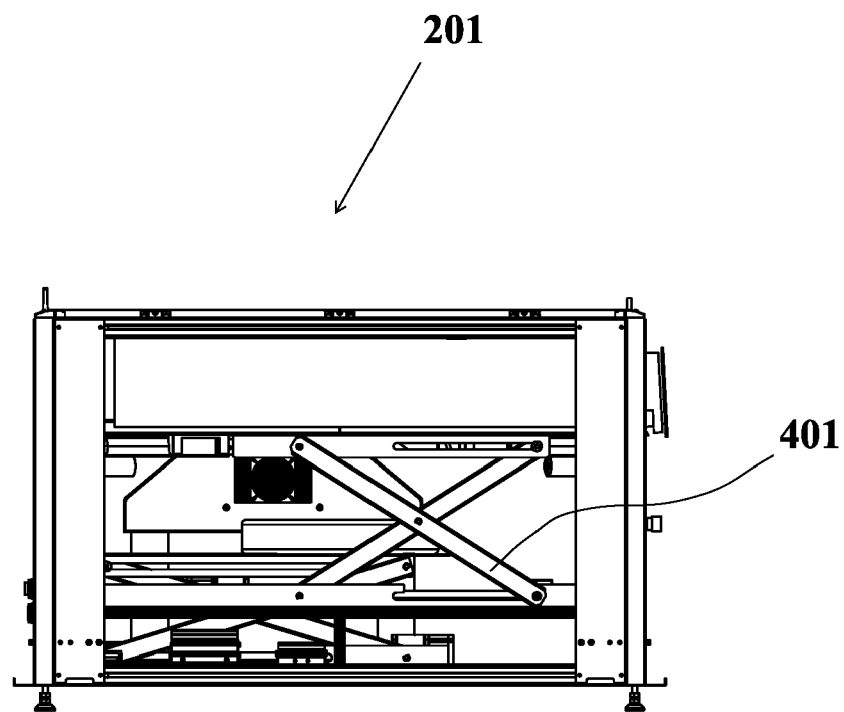
FIG. 4 is a side view of the charging platform of FIG. 2, with the side walls removed.
Figure 5:
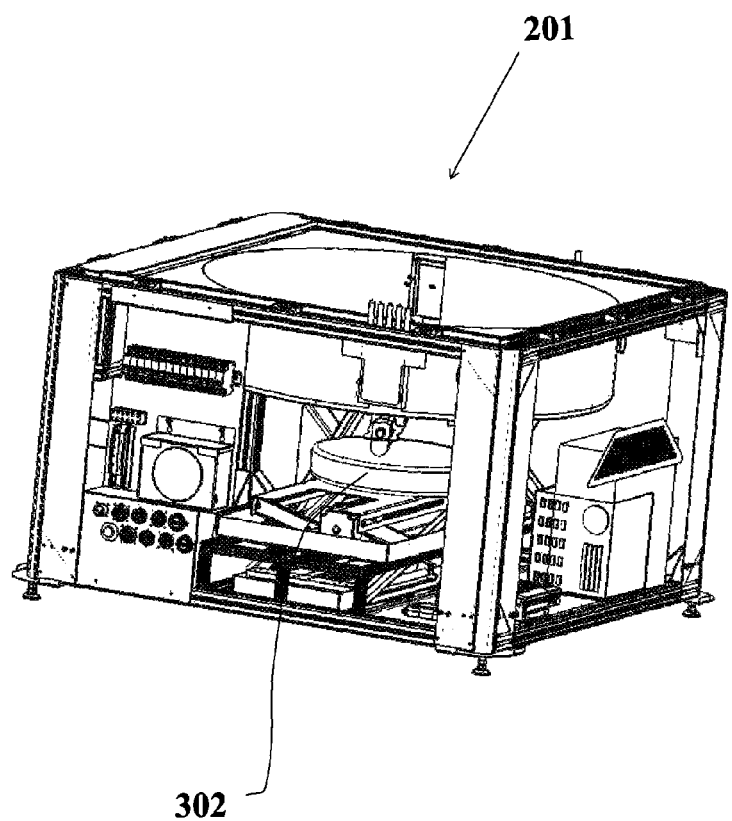
FIG. 5 is a perspective view of the charging platform of FIG. 4, showing the landing surface at its lowest position.

FIG. 4 is a side view of charging platform 201 of FIG. 2, in which the side walls are removed, showing that landing surface 302 of FIG. 3 can be raised higher by elevation means 401. The elevation of landing surface 302 can contribute to the positioning of a drone on it, and the drone can be lowered down when wishing to close cover 202 of FIG. 2, as shown in FIG. 5, which is a perspective view of charging platform 201 of FIG. 4, showing landing surface 302 at its lowest position. The elements shown in FIG. 5 and not described in detail are conventional electric and mechanical parts, needed to perform the operations described herein, the exact description of which is not required to understand the invention. Those elements, therefore, are not described in detail, for the sake of brevity.

When a drone is taking off, mechanical components of the third sub-system can automatically or remotely release the drone. If the third sub-system is based on electro-magnetic components, they can be deactivated to release the drone by releasing the gripping wire.

Figure 7:
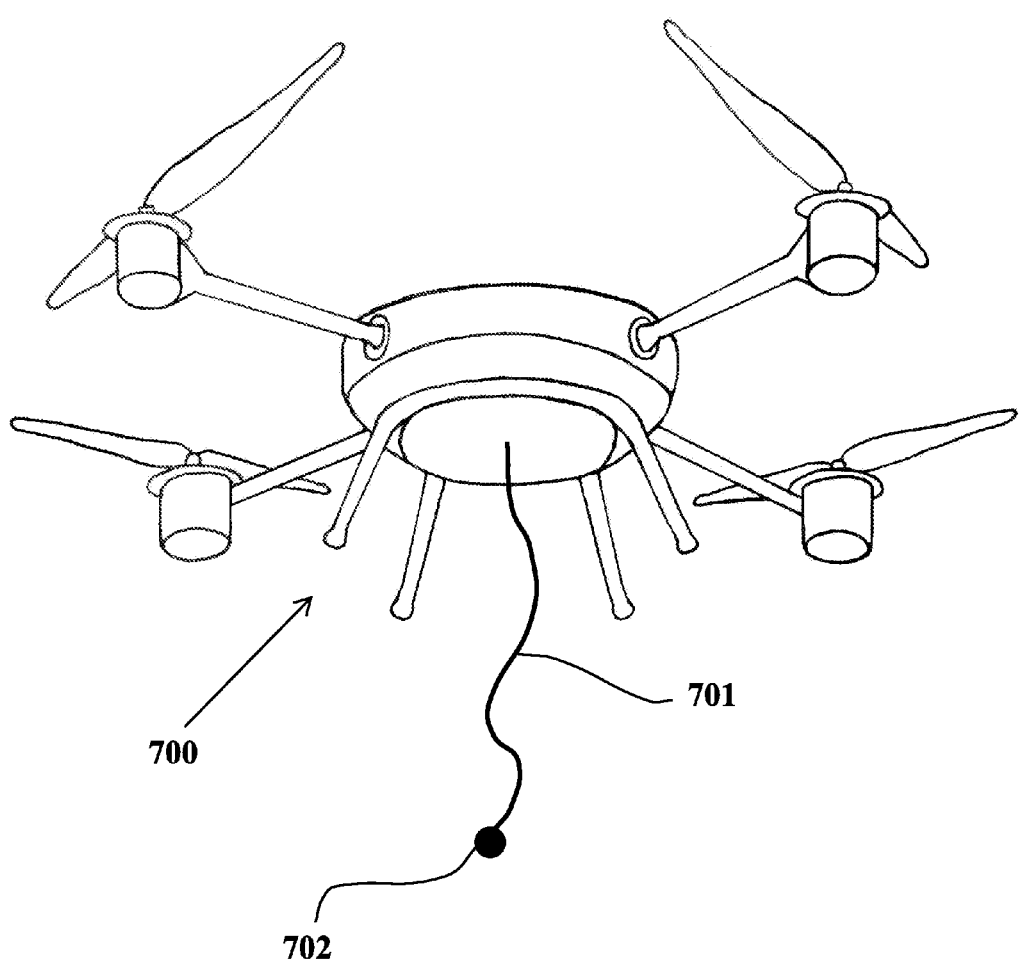
FIG. 7 further illustrates the initial stage of the landing of an illustrative drone.

Looking now at FIG. 7, a generic drone 700 is shown with a gripping wire 701 released therefrom, which in this particular embodiment is provided with a ferromagnetic weight 702 at its tip. The gripping wire can be released by any suitable means, e.g., by a winch, and once it dangles downward, weight 702 is captured by the electromagnets of the landing platform, e.g., 103 of FIG. 1. Once the gripping wire has reached the center of the landing platform by virtue of the electromagnetic forces acting on weight 702, if desired, it can be firmly locked into the landing platform by any suitable locking assembly. Then, applying a tension on wire 701, either by winding it in a winch located in the drone or by pulling it down using a pulling assembly located in the landing platform (not shown) will cause the drone to be centered and to land essentially at the center of the landing platform.

All the above description has been provided for the purpose of illustration and is not meant to limit the invention in any way except as provided for in the appended claims.

The invention claimed is:

1. A system for homing and recharging an unmanned flying object, comprising:
   a plurality of homing layers operative along a radius of an imaginary circle that has a homing target at a center of the imaginary circle,
   each homing layer consisting of a sub-system provided with location means of increasing accuracy relative to that of a sub-system that operates along said radius farther away from the center of said circle,
   wherein an inner homing layer of said plurality of homing layers comprises physical positioning means for physically connecting the unmanned flying object while still in flight with a landing platform at the homing target,
   wherein the location means are selected from among GPS, DGPS, computerized visual analysis systems, optical sensors, proximity sensors, electromagnetic sensors, RF systems, and
   wherein the physical positioning means comprise centralizing means and grabbing means.

2. The system according to claim 1, wherein the flying object is an unmanned aerial vehicle (UAV).

3. The system according to claim 1, wherein the centralizing and grabbing means, or part thereof, are located on the landing platform.

4. The system according to claim 1, wherein the centralizing and grabbing means, or part thereof, are located on the flying object.

5. The system according to claim 1, wherein the physical positioning means further comprises grippers, including gripping wires and electromagnetic assemblies.

6. The system according to claim 1, further comprising battery charging apparatus or battery replacing apparatus.

7. The system according to claim 1, wherein the sub-systems can be remotely-controlled.

8. The system according to claim 1, further comprising at least one data-management and/or data-processing component.

9. The system according to claim 8, wherein the data-management component is a processor.

10. The system according to claim 8, wherein the data-management component is a receiver.

11. The system according to claim 8, wherein the data-management component is suitable to receive data from the flying object.

12. A flat coil device configured for use with the system of claim 1, wherein the flat coil device is arranged for an electric current to run through a coil of the flat coil device, the electric current generating a magnetic field that creates traction of different materials toward a center of the flat coil device.

13. The system according to claim 1, wherein the physical positioning means is operable to:
   (a) lower a connecting wire from the flying object;
   (b) connect the flying object with the homing target at the landing platform; and
   (c) cause a tension to be applied to the connecting wire until the flying object is centered with respect to, and lands at, the homing target.

14. The system according to claim 13, wherein the physical positioning means is operable to reduce the length of the connecting wire by coiling the connecting wire onto the flying object by a winch.

15. The system according to claim 13, wherein the physical positioning means is operable to reduce the length of the connecting wire by an apparatus located at the landing platform.

16. The system according to claim 1, which comprises three homing layers, wherein an outermost homing layer comprises a global positioning system by which the flying object is able to be navigated toward the homing target, and an intermediate homing layer between the outermost homing layer and the inner homing layer comprises a proximity system by which a relative position of the flying object in relation to the homing target is able to be calculated and by which the flying object is able to be guided toward the homing target.

17. The system according to claim 1, further comprising a docking station within which the flying object lands and is recharged, wherein the docking station comprises a charging surface which coincides with the homing target, and a cover used for protecting charging and communication components of the docking station, said cover configured to be automatically opened when the flying object approaches the charging surface.

18. An autonomous unmanned aerial vehicle (UAV) interacting with a homing and recharging system comprising a plurality of homing layers operative along a radius of an imaginary circle that has a homing target at a center of the imaginary circle, each homing layer consisting of a sub-system provided with location means of increasing accuracy relative to that of a sub-system that operates along said radius farther away from the center of the imaginary circle,
   said UAV comprising physical positioning means configured to interact with an inner homing layer of said plurality of homing layers so as to physically connect said UAV while still in flight with a landing platform at the homing target,
   wherein said physical positioning means is operable to:
      i. lower a connecting wire from said UAV;
      ii. connect said UAV with the homing target at the landing platform; and
      iii. cause a tension to be applied to said connecting wire, until said UAV is centered with respect to, and lands at, the homing target.

* * * * *